(12) United States Patent  (10) Patent No.: US 6,994,375 B2
McCoy  (45) Date of Patent: Feb. 7, 2006

(54) ADVANCED ROLLOVER SEAT BELT SYSTEM FOR A VEHICLE

(75) Inventor: Robert McCoy, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 216 days.

(21) Appl. No.: 10/744,415

(22) Filed: Dec. 22, 2003

(65) Prior Publication Data

US 2005/0133291 A1   Jun. 23, 2005

(51) Int. Cl.
*B60R 22/00* (2006.01)
(52) U.S. Cl. .................. 280/801.1; 280/735; 24/163 R
(58) Field of Classification Search ............. 280/801.1, 280/806, 808, 735; 24/163 R, 164, 628, 24/633, 631, 640, 654
See application file for complete search history.

(56) References Cited

U.S. PATENT DOCUMENTS

| | | | |
|---|---|---|---|
| 3,880,448 A | 4/1975 | Lipschutz | |
| 4,208,770 A | 6/1980 | Takada | |
| 4,223,915 A | 9/1980 | Tanaka | |
| 4,544,112 A | 10/1985 | Ziv | |
| 4,678,928 A * | 7/1987 | Nishimura et al. | 180/282 |
| 4,792,158 A | 12/1988 | Andersson | |
| 5,332,262 A | 7/1994 | Chou | |
| 5,492,368 A | 2/1996 | Pywell | |
| 5,522,619 A * | 6/1996 | Collins | 280/806 |
| 5,718,451 A | 2/1998 | White | |
| 5,752,299 A * | 5/1998 | Vivacqua et al. | 24/633 |
| 6,076,239 A * | 6/2000 | Kopetzky et al. | 24/633 |
| 6,725,509 B1 * | 4/2004 | Lee et al. | 24/641 |
| 6,746,048 B2 * | 6/2004 | Tajima et al. | 280/801.1 |
| 6,868,745 B2 * | 3/2005 | Sullivan et al. | 73/862.391 |
| 6,889,408 B2 * | 5/2005 | Itoigawa et al. | 24/633 |

* cited by examiner

*Primary Examiner*—Paul N. Dickson
*Assistant Examiner*—Toan C. To
(74) *Attorney, Agent, or Firm*—Gigette M. Bejin

(57) ABSTRACT

The present invention provides a vehicle seat belt system having a shoulder belt portion and a lap belt portion including a relay device adapted to receive a predetermined signal from a vehicle sensor, a buckle operatively attached to the relay device, a locking tongue detachably received by the buckle in operative communication with the buckle when the buckle and locking tongue are attached, a housing portion in operative communication with the buckle via the locking tongue portion with a trigger mechanism adapted to be activated in response to the predetermined signal received by the relay device, a locking structure having a belt length received therethrough actuatably engaged by the trigger mechanism, and wherein the locking structure is adapted to lock the belt length in place when the trigger mechanism is activated.

18 Claims, 4 Drawing Sheets

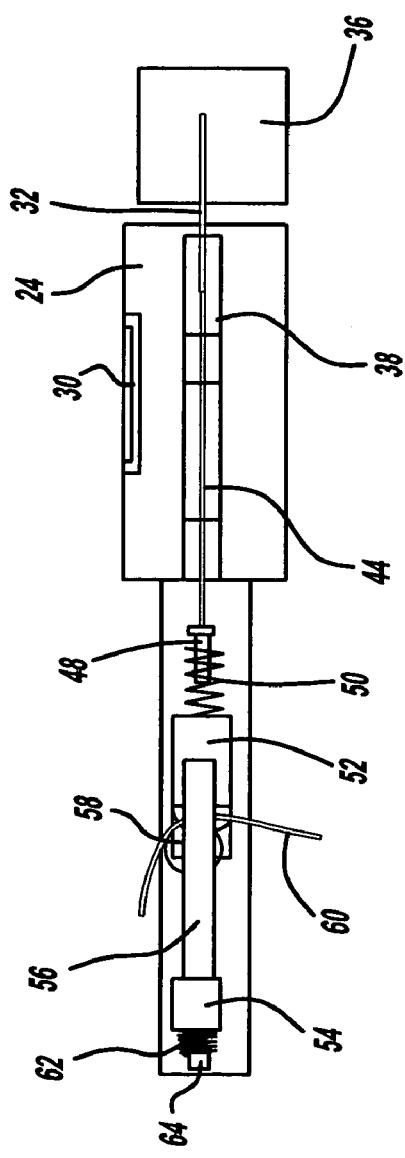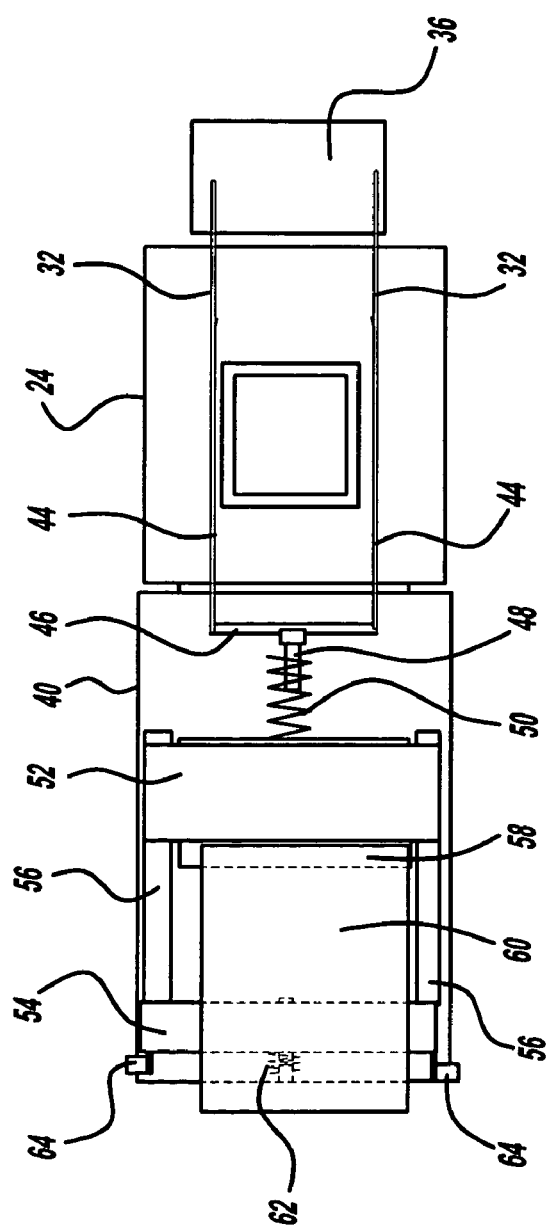

US 6,994,375 B2

ADVANCED ROLLOVER SEAT BELT SYSTEM FOR A VEHICLE

FIELD OF THE INVENTION

The present invention relates to vehicle seat belts systems, and more specifically, to an advanced rollover seat belt buckle for such systems.

BACKGROUND OF THE INVENTION

Most passenger restraint devices employ safety belts that are wound upon automatic, emergency locking safety belt retractors that are secured to the vehicle frame. With use of these retractors, the reels lock in response to a relatively high, abnormal acceleration or deceleration of the vehicle. However, emergency locking retractors allow a rather considerable extension of safety belt webbing, even though the reel is locked, because the several turns of the belt webbing normally on the reel are initially loose until pulled tight when the passenger is thrown forward and also because the belt webbing itself elongates.

Various types of locking means have been used to avoid the extension of the safety belt webbing. However, these have been unsatisfactory because they allow the belt to slip or they preset a risk of belt failure because they cut or dig into the belt. In other instances, the lock can be so effective that it is difficult to release the belt, thus causing greater danger to the occupant when there is need for rapid escape from the vehicle after an accident. Further still, some locking means employ an increased spring force which makes the belt more difficult to fasten and unpleasant to wear, because the belt exerts a heavier pressure on the occupants chest.

This seat belt webbing extension and slack is particularly problematic in rollover accidents. In a typical rollover event, the vehicles occupants experience lateral decelerations prior to encountering any rotational motion. During this lateral deceleration phase, the resulting occupant motion can cause the seat belt to slide off the occupants shoulder and generate slack in the lap belt portion of the seat belt. Therefore, as the occupant begins to experience rotational and vertical motion, this additional lap belt slack hinders the effectiveness of the lap belt and allows the occupant to move vertically out of position and either strike the vehicle's roof or be ejected from the vehicle.

It would therefore be beneficial to have a device that improves the effectiveness of a standard three-point belt system by minimizing a belted occupants vertical excursion and reducing the possibility of ejection from a vehicle in the event of a rollover accident by reducing the amount of belt slack transferred to the lap portion of the seat belt.

Therefore, it is desired to have a safety belt webbing emergency locking device that provides a quick restraint of the safety belt in the event of an emergency, and particularly a rollover event, while also reducing lap belt slack and any belt webbing extension after actuation, without damaging the webbing.

SUMMARY OF THE INVENTION

It is an object of the present invention to provide an advanced rollover seat belt system for a vehicle that overcomes the disadvantages of the prior art.

Accordingly, the present invention provides a vehicle seat belt system having a shoulder belt portion and a lap belt portion including a relay device adapted to receive a predetermined signal from a vehicle sensor, a buckle operatively attached to the relay device, a locking tongue detachably received by the buckle in operative communication with the buckle when the buckle and locking tongue are attached, a housing portion in operative communication with the buckle via the locking tongue portion with a trigger mechanism adapted to be activated in response to the predetermined signal received by the relay device, a locking structure having a belt length received therethrough actuatably engaged by the trigger mechanism, and wherein the locking structure is adapted to lock the belt length in place when the trigger mechanism is activated.

It is a feature of the present invention that the advanced rollover seat belt system includes a reset mechanism, operative to release the locking structure from the belt length and reset the trigger mechanism after the belt length has been locked, which can be manually or automatically reset.

BRIEF DESCRIPTION OF THE DRAWINGS

These and other objects, features, and advantages of the present invention will become apparent from a reading of the following detailed description with reference to the accompanying drawings, in which:

FIG. 6 is a cutaway side view of an advanced rollover seat belt buckle in a post-activation state according to the present invention; and FIG. 7 is a cutaway top view of an advanced rollover seat belt buckle in a post-activation state according to the present invention.

DESCRIPTION OF THE PREFERRED EMBODIMENT(S)

Figure 1:
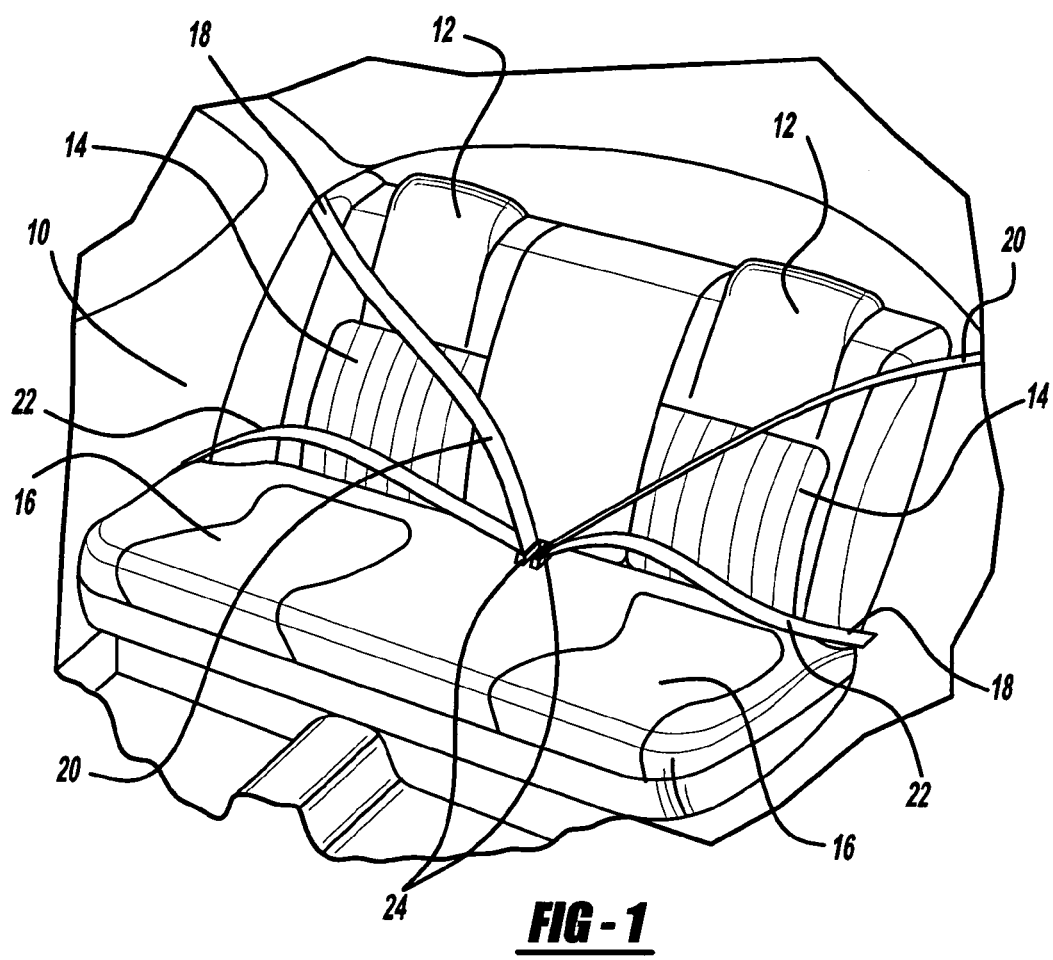
FIG. 1 is a partial perspective view of a passenger space of a vehicle having a seat belt system with an advanced rollover seat belt buckle according to the present invention.

In FIG. 1, a vehicle's passenger space 10 is shown. In the passenger space 10 are seats 12. The seats 12 have a back portion 14 and a front portion 16. The seats 12 in the passenger space 10 have a standard three-point seat belt system 18.

The seat belt system 18 has a diagonal extending shoulder belt portion 20, a horizontal extending lap belt portion 22, an advanced rollover seat belt buckle 24, and a latch (not shown). The seat belt system 18 also has emergency locking seat belt retractors (not shown) secured to a vehicle frame (not shown) that lock in response to a relatively high, abnormal acceleration or deceleration. These emergency locking seat belt retractors are connected to both the end of the shoulder belt portion 20 near the top of the back portion 14 of the seat 12 and the end of the lap belt portion 22 near the rear of the front portion 16 of the seat 12 so as to lock both portions and, in conjunction with the buckle 24 and latch, keep the passenger restrained in the event of an accident.

Figure 2:
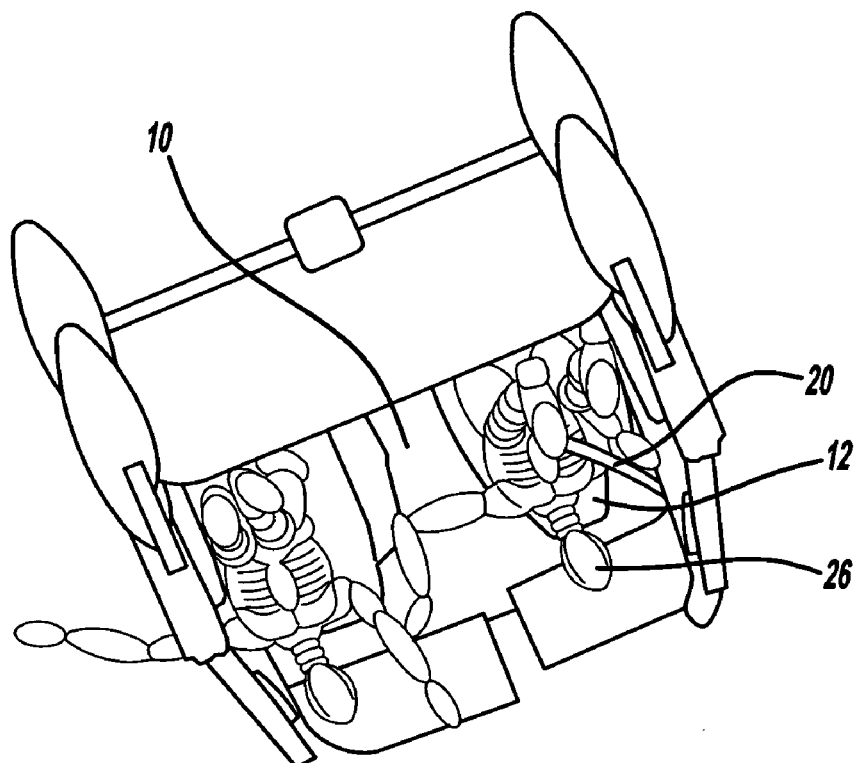
FIG. 2 is a front view of a rollover event showing the vertical excursion reduction achieved from activation of the advanced rollover seat belt buckle according to the present invention.

Referring to FIG. 2, a vehicle rollover event is shown utilizing the advanced rollover seat belt buckle 24. In such a rollover event, the buckle 24 is activated which results in a reduced amount of belt slack transferred to the lap belt portion 22. In such an event when the buckle 24 is activated, the occupants 26 vertical excursion is minimized and the possibility of ejection from the vehicle is reduced. This difference can be seen when comparing FIG. 2 and FIG. 3.

Figure 3:
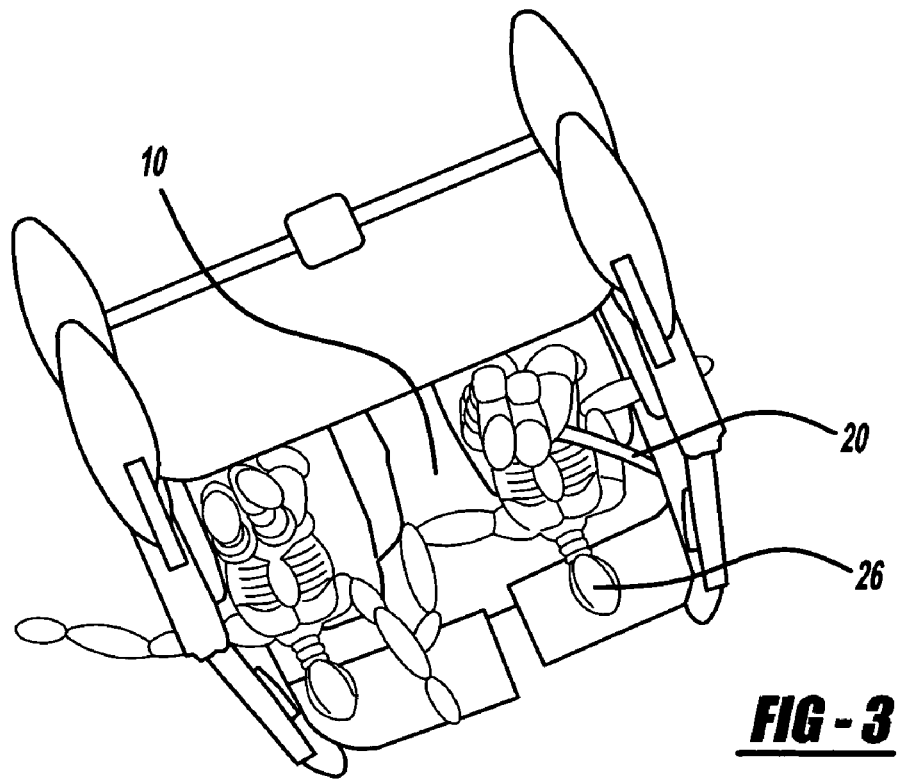
FIG. 3 is a front view of a rollover event showing the amount of vertical excursion in a typical rollover accident according to the present invention.

In FIG. 3, a vehicle rollover event is shown without the use of the advanced rollover seat belt buckle 24. In this typical rollover event, the occupants 26 experience lateral decelerations prior to encountering any rotational motion. During the lateral deceleration, the resulting motion of the occupant 26 causes the shoulder belt portion 20 to slide off the occupants 26 shoulder which then generates slack in the lap belt portion 22 of the seat belt system 18. Therefore, as the occupant 26 begins to experience rotational and vertical motion, the additional slack of the lap belt portion 22 hinders the effectiveness of the lap belt portion 22 and allows the occupant 26 to move vertically out of position and potentially strike the vehicle roof or be ejected from the vehicle. When comparing FIG. 3 and FIG. 2, the amount of vertical excursion reduction achieved for the trailing side occupant 26 in FIG. 2 as a result of the buckle 24 being activated at the beginning of the rollover event can be seen.

Figure 4:
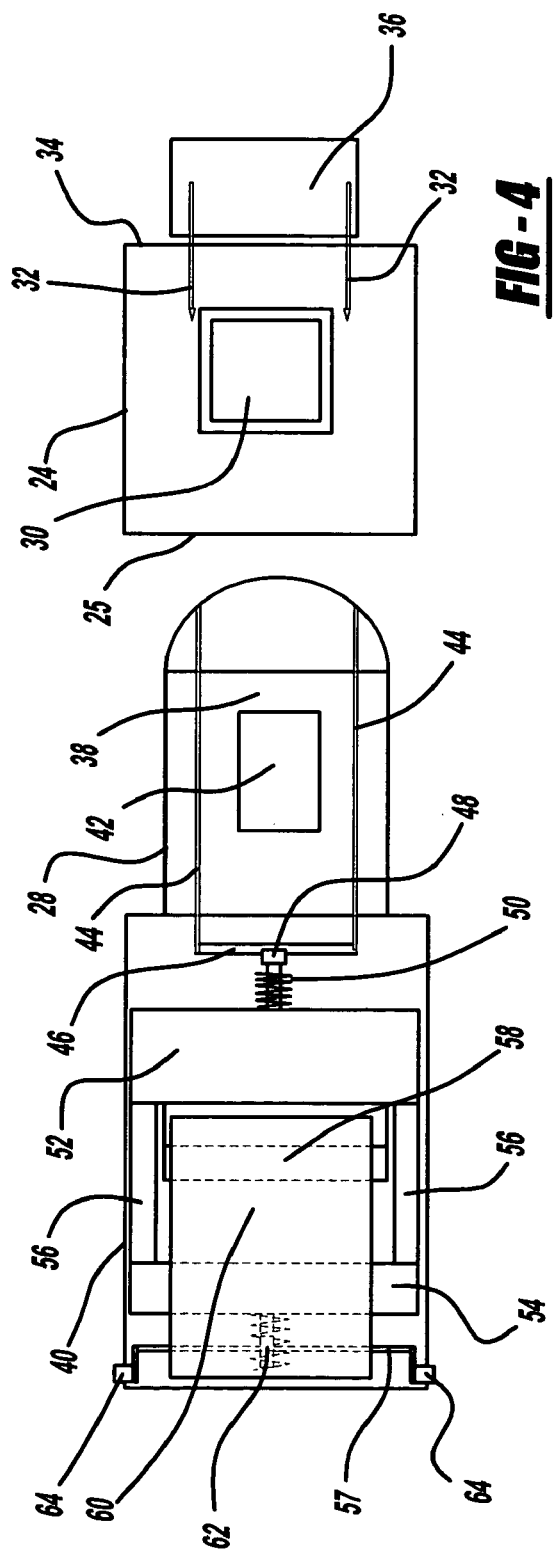
FIG. 4 is a cutaway top view of an advanced rollover seat belt buckle in a pre-activation state according to the present invention.

A closer look at the advanced rollover seat belt buckle 24 can be seen in FIG. 4. Here, the buckle 24 and a latch 28 are shown. The buckle 24 is substantially square-shaped and is a predetermined thickness. The buckle 24 has an opening (not shown) in an edge 25 nearest the latch 28 in which to receive the latch 28 when the seat belt system 18 is to be fastened. The buckle 24 has a release button 30 substantially centrally located thereon. The release button 30 is substantially square-shaped and a predetermined depth, and functions to release the latch 28 from the buckle 24 when pushed upon by the occupant 26. The buckle 24 also has a pair of slidable activation rods 32 that are a predetermined diameter and extend a predetermined length from an edge 34 opposite the latch 28. The activation rods 32 are a predetermined distance apart from one another.

Connected to the buckle 24 via the activation rods 32 is a relay device 36. The relay device 36 is a small, low voltage electrical device. A rollover or IVD sensor (not shown) measures vehicle kinematics and using this input, an algorithm determines activation time and sends a signal to the relay device 36. When the relay device 36 receives this signal, it slides the activation rods 32, which is the first step of the activation process of the advanced rollover seat belt buckle 24.

The latch 28 of the advanced rollover seat belt buckle 24 has a locking portion 38 and a housing portion 40. The locking portion 38 is a predetermined thickness and is substantially u-shaped, such that the curved portion leads into the buckle 24 upon fastening. The locking portion 38 has a hole 42 therethrough that is substantially square-shaped and substantially centrally located. The hole 42 works in conjunction with the release button 30 of the buckle 24 in order to secure the locking portion 38 of the latch 28 into the buckle 24, as well as release the locking portion 38 of the latch 28 from the buckle 24.

The locking portion 38 of the latch 28 has a pair of slidable push rods 44 that are a predetermined diameter. The push rods 44 extend the entire length of the locking portion 38 of the latch 28, and further extend a predetermined distance into the housing portion 40. The push rods 44 are spaced a predetermined distance apart from one another such that they are aligned with the activation rods 32 of the buckle 24 when the latch 28 is secured in the buckle 24. After the activation rods 32 begin sliding as a result of the signal received by the relay device 36, they then slide the push rods 44.

In the housing portion 40, there is a movable push rod connector 46 which extends a predetermined length and connects to each of the push rods 44. When the push rods 44 are slid as a result of activation of the advanced rollover seat belt buckle 24, the movement of the push rod connector 46 activates a trigger mechanism 48. The trigger mechanism 48 is connected to the push rod connector 46 at substantially the center of the push rod connector 46. The trigger mechanism 48 extends outward from the push rod connector 46 a predetermined length. The trigger mechanism 48 utilizes stored energy in the form of a compressed activation spring 50.

Situated adjacent the compressed activation spring 50 of the trigger mechanism 48 is a slidable lock bar 52. The lock bar 52 extends substantially the width of the housing portion 40 and is a predetermined length. The lock bar 52 is a predetermined thickness. When the push rods 44 cause the push rod connector 46 to activate the trigger mechanism 48, the compressed activation spring 50 is released and the force of the spring 50 causes the lock bar 52 to slide away from the trigger mechanism 48.

The lock bar 52 is able to move via use of a slidable slide bar 54 and movable side connector bars 56. The slide bar 54 extends substantially the width of the housing portion 40 and is a predetermined length and a predetermined thickness. The slide bar 54 is a predetermined distance from the lock bar 52 and is connected to it via the side connector bars 56.

Each of the side connector bars 56 is connected at one end to the lock bar 52 and at the other end the slide bar 54. The side connector bars 56 are a predetermined width and a predetermined thickness. When the compressed activation spring 50 is released and it pushes against the lock bar 52, the slide bar 54 is slid via the side connector bars 56 and is locked into place via a lock/reset mechanism 57 as a result of the spring 50 force. Locking prevents the slide bar 54 from moving back towards the buckle 24. The locking force increases with increasing force applied by the occupant 26 on the seat belt system 18. The lock/reset mechanism 57 holds the slide bar 54 in place until it is either manually or automatically released, or reset.

Situated a predetermined distance between the lock bar 52 and the slide bar 54 is a pinch bar 58. The pinch bar 58 is a predetermined length and a predetermined thickness. The pinch bar 58 extends substantially the width between the side connector bars 56. When the slide bar 54 is slid and locked into place, the lock bar 52 is slid against the pinch bar 58 such that seat belt webbing 60 is pinched between the pinch bar 58 and the lock bar 52 and firmly held in place.

Connected to the slide bar 54 at substantially the center of the slide bar 54 and extending outwardly a predetermined distance toward the lock/reset mechanism 57 is reset means including a reset spring 62. When the slide bar 54 is moved and locked into place as a result of the force of the activation spring 50, the reset spring 62 becomes compressed and then becomes stored energy for when the advanced rollover seat belt buckle 24 is to be released, or reset. The device can be reset automatically via a signal received by the relay device 36 from the algorithm, or manually via a manual reset button 64 on the housing portion 40 which is connected to the lock/reset mechanism 57.

Upon either automatic or manual release of the advanced rollover seat belt buckle 24, the lock/reset mechanism 57 is activated, which releases the compressed reset spring 62. The reset spring 62 then slides the slide bar 54 and the lock bar 52 via the side connector bars 56 so that the lock bar 52 moves away from the pinch bar 58 and the seat belt webbing 60 is released from between the pinch bar 58 and the lock bar 52. The lock bar 52 then compresses the activation spring 50 and the advanced rollover seat belt buckle 24 is reset.

Figure 5:
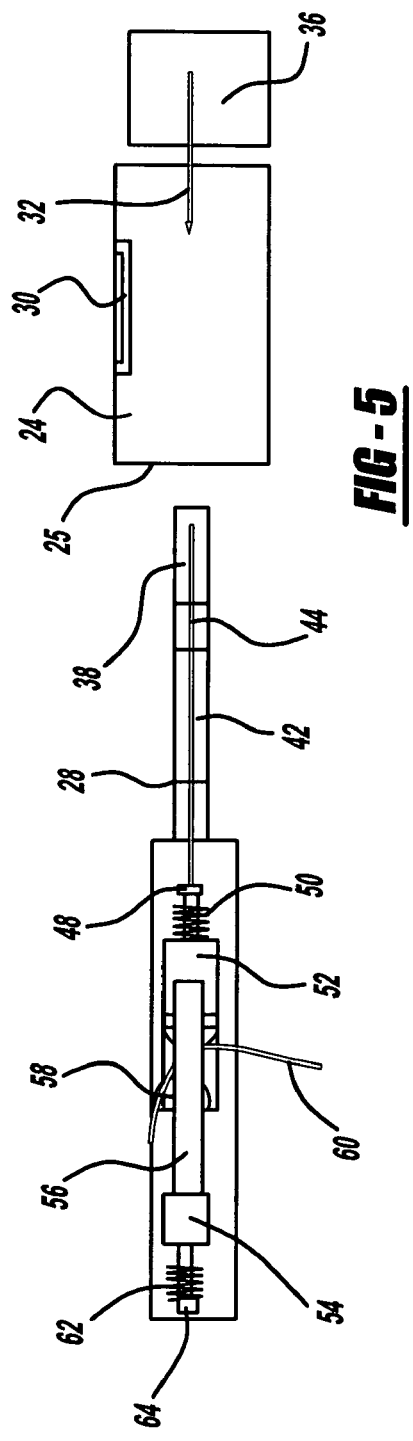
FIG. 5 is a cutaway side view of an advanced rollover seat belt buckle in a pre-activation state according to the present invention.

A cutaway side view of the advanced rollover seat belt buckle 24 in a pre-activation state can be seen in FIG. 5. As seen here, the seat belt webbing 60 rests relatively loosely between the pinch bar 58 and the lock bar 52. The activation spring 50 is compressed and will be activated once the activation rods 32 activate the push rods 44 when a signal is received by the relay device 36.

FIGS. 6 and 7 show the advanced rollover seat belt buckle 24 in a post-activation state. As seen here, the activation rods 32 slid the push rods 44 such that the trigger mechanism 48 was activated which then released the activation spring 50. The lock bar 52 and slide bar 54 slid away from the trigger mechanism 48 such that the seat belt webbing 60 is pinched tightly between the pinch bar 58 and the lock bar 52. The slide bar 54 is locked in place and the reset spring 62 is compressed. In such a state, the occupant 26 reduces vertical excursion during a rollover event. The advanced rollover seat belt buckle 24 is automatically or manually released as previously described above. The advanced rollover seat belt buckle 24 can be combined with other restraint hardware, sensor hardware, and by developing new firing logic and sensor algorithms without departing from the scope of the present invention.

While only one embodiment of the advanced rollover seat belt buckle of the present invention has been described, others may be possible without departing from the scope of the following claims.

What is claimed is:

1. A vehicle seat belt system having a shoulder belt portion and a lap belt portion comprising:
    a relay device adapted to receive a predetermined signal from a vehicle sensor;
    a buckle, having a release button, operatively attached to the relay device;
    a locking tongue, detachably received by the buckle via the release button, in operative communication with the buckle when the buckle and locking tongue are attached;
    a housing portion, in operative communication with the buckle via the locking tongue portion, including:
    a trigger mechanism adapted to be activated in response to the predetermined signal received by the relay device;
    a locking structure, having a belt length received therethrough, actuatably engaged by the trigger mechanism; and
    wherein the locking structure is adapted to lock the belt length in place when the trigger mechanism is activated.

2. The seat belt system as defined in claim 1, wherein the buckle and relay device are operatively attached by a pair of activation rods.

3. The seat belt system as defined in claim 2, wherein the housing portion and the buckle operatively communicate by a pair of push rods slidingly carried by the locking tongue.

4. The seat belt system as defined in claim 3, wherein the activation rods and the push rods are aligned when the buckle and locking tongue are attached.

5. The seat belt system as defined in claim 1, wherein the trigger mechanism is activated by a spring.

6. The seat belt system as defined in claim 1, further including a reset mechanism carried by the housing portion operative to release the locking structure from the belt length and reset the trigger mechanism.

7. The seat belt system as defined in claim 6, wherein the reset mechanism is manually actuatable by a manual reset button carried by the housing.

8. A vehicle seat belt system having a shoulder belt portion and a lap belt portion comprising:
    a relay device adapted to receive a predetermined signal from a vehicle sensor;
    a buckle, having a release button, operatively attached to the relay device;
    a locking tongue, detachably received by the buckle via the release button, in operative communication with the buckle when the buckle and locking tongue are attached;
    a housing portion, in operative communication with the buckle via the locking tongue portion, including:
    a trigger mechanism adapted to be activated in response to the predetermined signal received by the relay device;
    a locking structure, having a belt length received therethrough, actuatably engaged by the trigger mechanism;
    wherein the locking structure is adapted to lock the belt length in place when the trigger mechanism is activated; and
    a reset mechanism operative to release the locking structure from the belt length and reset the trigger mechanism after the belt length has been locked.

9. The seat belt system as defined in claim 8, wherein the buckle and relay device are operatively attached by a pair of activation rods.

10. The seat belt system as defined in claim 9, wherein the housing portion and the buckle operatively communicate by a pair of push rods slidingly carried by the locking tongue.

11. The seat belt system as defined in claim 10, wherein the activation rods and the push rods are aligned when the buckle and locking tongue are attached.

12. The seat belt system as defined in claim 8, wherein the reset mechanism is manually actuatable by a manual reset button carried by the housing.

13. The seat belt system as defined in claim 8, wherein the reset mechanism is automatically actuatable by a signal received by the relay device.

14. A vehicle seat belt system having a shoulder belt portion and a lap belt portion comprising:
    a relay device adapted to receive a predetermined signal from a vehicle sensor;
    a buckle, having a release button, operatively attached to the relay device;
    a locking tongue, detachably received by the buckle via the release button, in operative communication with the buckle when the buckle and locking tongue are attached;

a housing portion, in operative communication with the buckle via the locking tongue portion, including:

a trigger mechanism adapted to be activated in response to the predetermined signal received by the relay device;

a locking structure, having a belt length received therethrough, actuatably engaged by the trigger mechanism;

wherein the locking structure is adapted to lock the belt length in place when the trigger mechanism is activated;

a reset mechanism operative to release the locking structure from the belt length and reset the trigger mechanism after the belt length has been locked; and a manual reset button carried by the housing.

15. The seat belt system as defined in claim 14, wherein the buckle and relay device are operatively attached by a pair of activation rods.

16. The seat belt system as defined in claim 15, wherein the housing portion and the buckle operatively communicate by a pair of push rods slidingly carried by the locking tongue.

17. The seat belt system as defined in claim 16, wherein the activation rods and the push rods are aligned when the buckle and locking tongue are attached.

18. The seat belt system as defined in claim 14, wherein the reset mechanism is automatically actuatable by a signal received by the relay device.

* * * * *